United States Patent [19]
Leavitt

[11] Patent Number: 5,085,674
[45] Date of Patent: Feb. 4, 1992

[54] DUPLEX ADSORPTION PROCESS

[75] Inventor: Frederick W. Leavitt, North Tonawanda, N.Y.

[73] Assignee: Union Carbide Industrial Gases Technology Corporation, Danbury, Conn.

[21] Appl. No.: 603,479

[22] Filed: Oct. 25, 1990

[51] Int. Cl.$^5$ .............................................. B01D 53/04
[52] U.S. Cl. .............................................. 55/26; 55/28; 55/33; 55/61; 55/66; 55/68; 55/74
[58] Field of Search ............ 55/25, 26, 33, 58, 62, 55/68, 66, 73–75, 27, 28

[56] References Cited

U.S. PATENT DOCUMENTS

| Re. 31,014 | 8/1982 | Sircar | 55/26 |
|---|---|---|---|
| 2,137,605 | 11/1938 | Derr | 55/33 |
| 2,810,454 | 10/1957 | Jones et al. | 55/66 |
| 2,918,140 | 12/1959 | Brooks | 55/58 |
| 3,710,547 | 1/1973 | Nelson | 55/58 |
| 3,717,974 | 2/1973 | Batta | 55/58 |
| 4,011,065 | 3/1977 | Müzner et al. | 55/25 |
| 4,249,915 | 2/1981 | Sircar et al. | 55/26 |
| 4,273,621 | 6/1981 | Fornoff | 55/33 X |
| 4,351,732 | 9/1982 | Psaras et al. | 55/33 X |
| 4,354,859 | 10/1982 | Keller et al. | 55/25 |
| 4,359,328 | 11/1982 | Wilson | 55/26 |
| 4,386,945 | 6/1983 | Gardner | 55/26 |
| 4,407,662 | 10/1983 | Ginder | 55/33 |
| 4,472,178 | 9/1984 | Kumar et al. | 55/25 |
| 4,477,265 | 10/1984 | Kumar et al. | 55/58 X |
| 4,589,888 | 5/1986 | Hiscock et al. | 55/26 |
| 4,599,094 | 7/1986 | Werner et al. | 55/26 |
| 4,705,541 | 11/1987 | Sircar | 55/58 X |
| 4,726,818 | 2/1988 | Yeung et al. | 55/33 |
| 4,744,803 | 5/1988 | Knaebel | 55/25 |
| 4,810,265 | 3/1989 | LaGree et al. | 55/26 |
| 4,913,709 | 4/1990 | Kumar | 55/58 X |
| 4,914,218 | 4/1990 | Kumar et al. | 55/58 X |
| 4,915,711 | 4/1990 | Kumar | 55/58 X |

OTHER PUBLICATIONS

D. M. Ruthven, "Principles of Adsorption and Adsorption Process", Wiley & Sons, 1984, pp. 396–405.

Primary Examiner—Robert Spitzer
Attorney, Agent, or Firm—Alvin H. Fritschler

[57] ABSTRACT

A duplex adsorption process is carried out in one or more stages, each having a normal bed portion and an inverted bed portion that enables the less selectively adsorbable light component of a fluid mixture to be displaced from the normal bed portion and the more selectively adsorbable heavy component to be displaced from the inverted bed portion. Pressure swing adsorption and thermal swing adsorption processes can be employed.

27 Claims, 1 Drawing Sheet

DUPLEX ADSORPTION PROCESS

BACKGROUND OF THE INVENTION

1. Field of the Invention

The invention relates to gas separation using a pressure swing adsorption process. More particularly, it relates to the use of said process to enhance the recovery of two purified product fractions.

2. Description of the Prior Art

Pressure swing adsorption (PSA) processes and systems are well known in the art for achieving desirable separation and purification of a feed gas stream containing a more selectively adsorbable component and a less selectively adsorbable component. The more selectively adsorbable component is adsorbed as the feed gas is passed, at a higher adsorption pressure, over an adsorbent bed capable of selectively adsorbing said more selectively adsorbable component. Upon subsequent reduction of the bed pressure to a lower adsorption pressure level, the more selectively adsorbable component is desorbed from the adsorbent.

PSA processing is commonly carried out in systems containing more than one adsorbent bed, with each bed undergoing a processing sequence, on a cyclic basis, comprising (a) higher adsorption pressure feed - adsorption of the more selectively adsorbable component - discharge of less selectively adsorbable component, (b) lower pressure desorption and removal of the less selectively adsorbable component, typically from the feed end of the bed, and (c) repressurization of the bed to said higher adsorption pressure. PSA processing is particularly suited for air separation operations in a variety of industrial applications, particularly in relatively small sized operations for which the use of cryogenic air separation plants may not be economically feasible. PSA processing is also well suited to the drying of air or other gases.

In such drying applications, the moist gas is passed to the feed end of an adsorbent bed that preferentially adsorbs the water as the more selectively adsorbable component thereof. As water is removed from the adsorbent at the feed end of the bed, the bed becomes loaded with water and loses its adsorptive capacity with respect to additional quantities of moist gas passed therethrough. The following gas, depleted of moisture, encounters a zone of relatively dry adsorbent and emerges from the discharge end of the bed as a dry feed gas product. As such drying operations continue, an adsorption front of the more selectively adsorbed component, or mass transfer zone, moves through the bed from the feed end in the direction of the opposite, discharge end thereof, until the adsorption front reaches the vicinity of the discharge end and nearly all of the bed is water loaded. Before further drying can be achieved, the bed must be regenerated, i.e. the more selectively adsorbed water must be desorbed and removed from the bed. In PSA processing for drying, the selectively adsorbed water can be removed from the bed by depressurizing the bed from its higher adsorption pressure to a lower desorption pressure, typically by countercurrent depressurization in which gas is released from the feed end of the bed, and by flowing a dry purge gas through the bed from the discharge to the feed end thereof. The adsorption front of more selectively adsorbed water is thus driven back to the feed end of the bed. In a properly designed system, the concentration of the water impurity in the gas will increase when the pressure is reduced from its upper adsorption level, i.e. in a cocurrent depressurization step in which the pressure is decreased and gas is released from the discharge end of the bed. The amount of purge gas then required for desorption and removal of the more selectively adsorbed water is less than the amount of gas dried during adsorption. A portion of the dry air product is typically used as the purge gas, with the remaining dry air being removed from the system as the ultimate product stream.

Such conventional PSA processing is suitable for such air drying application because the moist feed air is freely available, and a high degree of recovery of the air is thus unnecessary. That is, the loss of air in the waste stream after purging is not of major importance. As those skilled in the art will appreciate, however, such a process may not be desirable or even satisfactory for the purification of a valuable gas that must be recovered without appreciable loss.

A typical PSA process for bulk gas separation is that for the production of oxygen from air by the selective adsorption of nitrogen and also of minor impurities such as water and carbon dioxide. The PSA processes used for such separation are conventional ones, similar to that referred to above for impurity removal, except that the more selectively adsorbed component, corresponding to the water impurity, is in very high concentration. This leads to short cycle times and a need for proper handling of the gases during the pressurization and depressurization steps. Representative examples of specific PSA processing cycles that have been used to produce oxygen from air are disclosed in the Batta patent, U.S. Pat. No. 3,717,974, and in the Hiscock et al. patent, U.S. Pat. No. 4,589,888. Again, such processes are satisfactory, at least in part, because the feed gas, i.e. air, is readily available, and a high degree of recovery of the product gas, i.e. oxygen, is not necessary for the economic feasibility of the air separation operation.

In the applications referred to above, i.e. air drying and air separation for the recovery of oxygen product, the more selectively adsorbable, or more strongly adsorbed, component is to be separated from the product gas constituting the less selectively adsorbable component, i.e. water from dry product air or nitrogen from oxygen product gas. This is typical of normal PSA processing. Such processing is not generally applicable for the purification of the more selectively adsorbable, or so-called heavy, component. Thus, the normal PSA processing cycles are satisfactory for the production of oxygen from air, but not for the production of nitrogen from air. While the gas released from the feed end of the bed is rich in nitrogen, compared to air, it is nevertheless too impure for most practical applications.

In other applications, it is desired to recover the more selectively, adsorbable or heavy component as the product gas, with the less selectively adsorbable or light component being removed as the impurity rather than as the desired product gas. The Wilson patent, U.S. Pat. No. 4,359,328, describes an inverted pressure swing adsorption process for this purpose. This process, desirably carried out in two or more beds, comprises a processing cycle of (1) low pressure adsorption, (2) pressurization to high pressure, (3) purging at said high pressure, and (4) depressurization for release of the more selectively adsorbed component as the desired product gas. In this process, the feed gas, e.g. air, is introduced into the adsorption bed at low pressure. The effluent from the bed, which is essentially the more selectively adsorbable component, is compressed to a high pressure, and a portion of this gas is used as a countercurrent purge gas to remove the less selectively adsorbable component from the bed. The remaining portion of said effluent gas is withdrawn as product gas, i.e. nitrogen in the case of air separation.

The process of the Wilson patent is superficially the inverse of the so-called normal PSA process. The inverted PSA process is different, however, in several important respects from the normal PSA process. After several cycles of operation of the inverted process, the heavy component will become concentrated in the low pressure effluent and on the product end of the beds. An adsorption-desorption front will be established in the bed, with the heavy component rich at the product end. The front can easily break through during the low-pressure portion of each cycle, thus allowing some of the light, i.e. less selectively adsorbable, component into the product stream. For this and other reasons, the inverted process needs to be operated for many cycles, possibly with a high reflux or purge ratio, before the heavy component becomes fully concentrated. Wilson discloses that, when the normal PSA process is optimized to enhance the nitrogen content of the low-pressure purge effluent, a nitrogen concentration of 88% was achieved, using air (80% nitrogen) as the feed gas. With the inverted process, Wilson discloses the concentration of the nitrogen to 96%, with a nitrogen recovery of 31.5%. This may be satisfactory for some applications in which the separation of air for the production of nitrogen is desired, even at relatively low nitrogen recovery. In other applications, however, the inverted PSA process of Wilson may not be able to concentrate and purify a valuable gas that must be obtained with a high level of product recovery.

Another means for concentrating the heavy, i.e. the more selectively adsorbable, component of a gas mixture is to employ a cocurrent-displacement type of PSA process. This type of PSA processing employs some of the features of both the normal and the inverted processes. Thus, the feed gas, e.g. air, is introduced into the feed end of the bed at high pressure and flows forward to the discharge end thereof, while the more selectively adsorbable, heavy component, i.e. nitrogen, is adsorbed on the bed. The light component, i.e. oxygen, of the gas stream passes through the bed and is discharged therefrom as a co-product or waste stream. The flow of feed gas, i.e. air, to the bed is stopped before the air-oxygen front, i.e., corresponding to the front of adsorbed nitrogen in the bed, reaches the discharge end of the bed. Nitrogen-rich product gas is then introduced into the feed end of the bed, which establishes a second front in the bed, i.e. a nitrogen-air front. This latter front moves faster than the air-oxygen front, which it eventually joins near the discharge end of the bed. At this point, the bed is loaded or saturated with the more selectively adsorbable nitrogen. Upon countercurrent depressurization from the feed end of the bed, this nitrogen is desorbed and is withdrawn from the feed end of the bed as the primary product. Further nitrogen product is obtained by purging the bed from the discharge end using some of the recovered oxygen as purge gas. The nitrogen thus produced is usually accumulated in a storage vessel, with some of said nitrogen gas being compressed and used as the cocurrent purge stream. Various other processing steps for pressure equalization and recycling are often employed to enhance the overall processing performance. Specific cocurrent displacement processes for the production of nitrogen from air have been disclosed in the Werner and Fay patent, U.S. Pat. No. 4,599,094, and in the Lagree and Leavitt patent, U.S. Pat. No. 4,810,265. These processes are capable of producing both nitrogen and oxygen from air with a high recovery of both components, with nitrogen usually being the principal product. In practical commercial applications using large diameter adsorbent beds, it is difficult to produce high-purity oxygen at the same time that high purity nitrogen is being produced.

While the co-current displacement cycles work well for obtaining nitrogen from air with a high product recovery, such cycles are not satisfactory for all circumstances encountered in the art. Thus, it is found that the process is not particularly effective when the heavy component is present in relatively low concentrations. In general, such co-current displacement processing can be carried out satisfactorily when the desorption of the more selectively adsorbable component is carried out under vacuum or at a pressure very much lower than the adsorption pressure, which pressure conditions may not be suitable or economical for many gas separation or purification applications.

Illustrative of other known PSA processes is the simulated moving bed process referred to in "Principles of Adsorption and Adsorption Processes" by D.M. Ruthven, Wiley and Sons, 1984, pp. 396–405. The process can produce high purity gases with high product recovery under some circumstances, but is relatively complex and costly, usually requiring the use of many adsorbent beds and valves. In addition, such processing often does not perform well when the adsorption isotherm of the heavy component is strongly curved or when there are several strongly adsorbed components with different equilibrium isotherms.

In another PSA processing approach described in the Keller and Kuo patent, U.S. Pat. No. 4,354,859, a feed gas is separated into two product streams by imposing cyclic pressure changes on both ends of an adsorbent bed. This process and system, referred to as a molecular gate, uses pistons to produce cyclic gas flows and pressure variations at the two ends of the bed, while the feed is admitted at an intermediate point. The volume displacements and phase angles of such opposing piston actions are adjusted to control the productivity and selectivity of the process. While the process and system enables two product streams to be produced, they are difficult to scale up to commercial size and to operate economically. As a result, the molecular gate approach has not been used for commercial gas separation or purification operations.

Thus, there remains a need in the art for improved PSA processing that is relatively simple, that uses only a few adsorbent beds and that can economically be employed to purify or separate a feed gas stream with high recovery of the desired product gas or gases.

It is an object of the invention to provide an improved PSA process for separating a multicomponent feed gas stream into two purified streams, without appreciable loss of the desired purified product gases.

It is another object of the invention to provide an improved PSA process for efficiently separating a binary gas stream into two pure gas fractions with a high recovery of both components of said gas stream.

It is another object of the invention to provide a PSA process for the removal of a more selectively adsorbable impurity from a less selectively adsorbable gas so as to produce a purified gas stream with a high recovery of the desired product gas.

It is a further object of the invention to provide a PSA process for the removal of a less selectively adsorbable impurity from a more selectively adsorbable gas so as to produce a purified gas stream with a high recovery of the desired product gas.

It is a further object of the invention to provide an improved PSA process for the removal of traces of nitrogen from an impure argon stream so that a purified argon stream can be produced with only a negligible loss of argon product in the purification process.

With these and other objects in mind, the invention is hereinafter described in detail, the novel features thereof being particularly pointed out in the appended claims.

SUMMARY OF THE INVENTION

Each adsorption bed is divided into two sections with a feed point between them to provide an integrated duplex PSA process and system. One section is operated as a normal PSA process, and the second section is operated in the manner of an inverted PSA process. The processing is carried out for both sections with a smooth flow of gas from one section to the other during each step of the overall process. The low pressure effluent from the normal section is passed to the low pressure feed end of the inverted section, and the high pressure effluent from the inverted section is passed to the feed end of the normal section. The mixed gas or impure gas feed stream is injected at the feed point between the normal and inverted sections during either the high pressure or low pressure steps, or both. In the practice of the invention, the PSA process and system can function as a complete binary separation system and produce the light and/or heavy component fractions at high purity and with high recovery thereof.

BRIEF DESCRIPTION OF THE INVENTION

The invention is hereinafter described in detail with reference to the accompanying drawings in which.

DETAILED DESCRIPTION OF THE INVENTION

Figure 1:
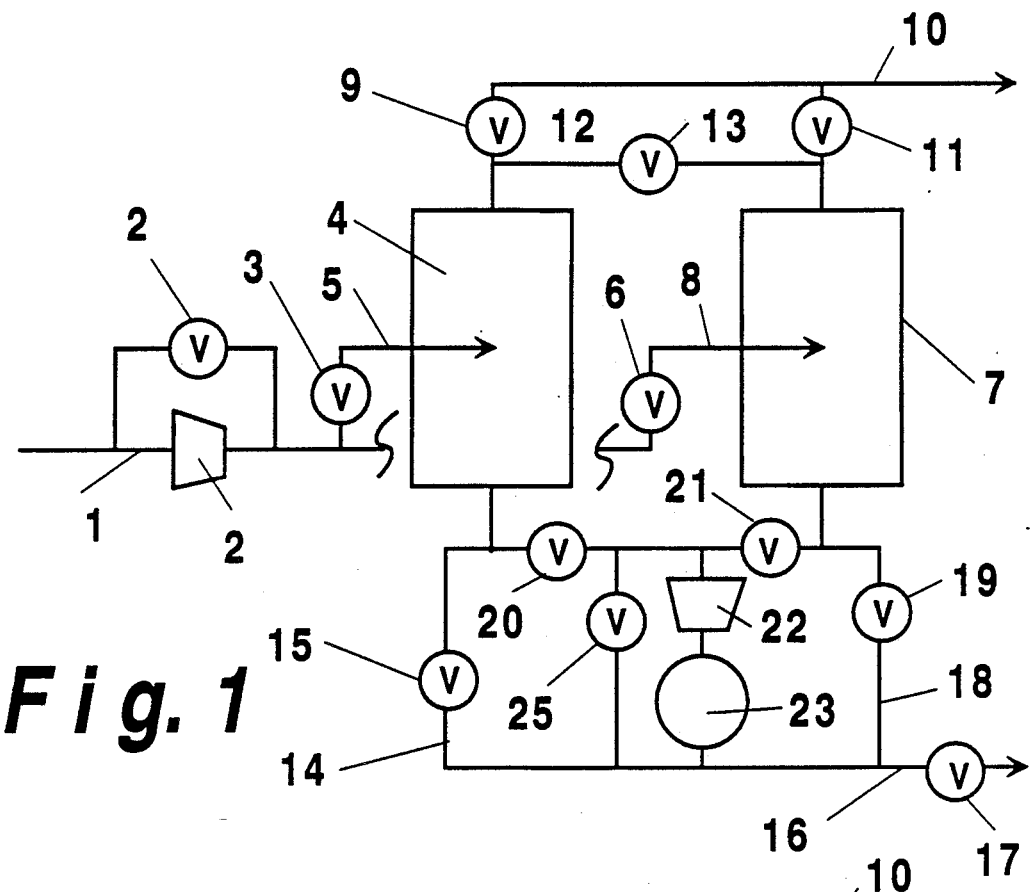
FIG. 1 is a schematic drawing illustrating a two-bed duplex PSA system used in the practice of the invention.

The objects of the invention are accomplished by providing a PSA process that combines the characteristic features of the normal and the inverted PSA approaches. The integrated duplex process and system of the invention is capable of producing purified or concentrated product streams without the undesired product losses that are inherent in the operation of either the normal PSA process or the inverted PSA process by itself. The invention is particularly useful for the removal of either light or heavy impurities from a valuable gas, where it is necessary to recover the product gas with little or negligible loss thereof, i.e., at high product recovery levels.

It will be appreciated in the art that the normal PSA process is generally carried out in two or more beds in which each bed, on a cyclic basis, undergoes a pressurization - depressurization sequence in which the more selectively adsorbable, or heavy, component is adsorbed at a higher adsorption pressure and desorbed at lower desorption pressure. In such normal processing sequence in each bed, the feed gas is compressed to the higher adsorption pressure and passed to the feed end of the bed, with the heavy component(s) being selectively adsorbed and with at least some of the light component(s) being removed from the discharge end thereof as purified light gas product. The remaining gas removed from the discharge end of the bed during the high pressure adsorption step is conveniently expanded and used to provide low pressure, countercurrent flow purge gas passed to the discharge end of another bed in the system. When the adsorptive capacity of the first bed is nearly exhausted, as by the adsorption front of the more selectively adsorbable component passing through the bed to the vicinity of the discharge end thereof, the flow of feed gas to the bed is terminated, and the depressurization phase of the cycle is commenced. At this point, the first bed is typically cocurrently depressurized by the release of gas from the discharge end of the bed. The gas thus released from the discharge end of the bed is preferably expanded into the discharge end of the second bed, or another bed in the system, for pressure equalization and/or provide purge gas purposes. The bed is then further depressurized to a lower desorption pressure level as by countercurrent depressurization and release of gas from the feed end of the bed, with such gas comprising the more selectively adsorbable component of the feed gas and being passed to waste or other use when the less selectively adsorbable component is the desired product gas. Following purge by the addition of the purge gas to the discharge end of the bed at its lower desorption pressure level, the bed is repressurized to the higher adsorption pressure level. Typically, the bed is initially repressurized from the lower desorption pressure to an intermediate pressure by the passage of gas from the discharge end of the second bed, or of another bed in a system undergoing depressurization, to the discharge end of said first bed for pressure equalization purposes. Feed gas is then passed to the feed end of the bed in order to increase the pressure thereof from the intermediate pressure to the upper adsorption pressure. The passage of feed gas to the feed end of the bed at the upper adsorption pressure is then continued, with the less readily adsorbable component being withdrawn therefrom as the cyclic operation is continued in said first bed.

To operate effectively, essentially all of the adsorbed heavy component(s) must be removed from the feed end of the bed and discharged to waste. A certain minimum amount of light component is necessarily lost in the waste, depending upon the components involved, the adsorbent material used in the beds, the pressure ratios involved and the like, in order to desorb and purge the more selectively adsorbable heavy impurities from the bed. The recovery of light gas component is inherently limited by this circumstance, particularly by the pressure ratio between the upper adsorption pressure and the lower desorption pressure inherent in such PSA processing. The normal PSA process is restricted, therefore, in the separation and recovery of the less selectively adsorbable component(s) to applications involving the separation of selectively low-value feed streams.

The normal PSA process as described above may be carried out with a variety of processing variations. Thus, vacuum and transatmospheric pressure levels may be employed. Multiple bed systems, with the cyclic processing sequence in each bed being carried out on a cyclic basis in conjunction with the carrying out of said sequence in each of the other beds in the system, may also be employed, so that the pressure change steps may be conducted without interruption of the feed and product flows of the overall system. Many different processing sequences have been described in the art, as with respect to various depressurization, pressure equalization and purge steps, to enhance the process performance for particular separations. All of these variations suffer from the same inherent limitation on the recovery of the light, less selectively adsorbable component.

In the practice of the inverted PSA process, the feed gas is passed to the first bed of a system at a lower pressure, such as atmospheric pressure. In this step, the less selectively adsorbable light component of the feed gas is adsorbed since it is at a higher component (or partial) pressure than the pressure of the component in the bed initially and after each depressurization step of the overall processing sequence comprising (1) adsorption at low pressure with release of the more selectively adsorbable component, (2) pressurization, (3) enriched waste, i.e., less selectively adsorbable component removal at high pressure, and (4) depressurization with release of the more selectively adsorbable heavy component at low pressure as the desired product of enhanced purity. The less selectively adsorbable component of the gas mixture thus displaces and depletes the more selectively adsorbable gas component in the adsorbed phase on the adsorbent. As a result, an advancing gas phase zone of the more selectively adsorbable component precedes a gas phase zone containing both more selectively and less selectively adsorbable gas components.

Increasing the pressure in the bed, in step (2) of the inverted process, causes the selective adsorption of the more selectively adsorbable component. This results in depletion of the more selectively adsorbable component in the gas phase and in the corresponding enrichment of the gas phase in the less selectively adsorbable component. The purging of the adsorbent bed with the readily adsorbable component, in step (3), serves to remove the gas phase enriched in the less selectively adsorbable component from the adsorbent bed. The depressurization of the adsorbent bed results, therefore, in the release of the more selectively adsorbable component from the bed at an enhanced purity level. Additional processing features, such as pressure equilibrium steps can be employed in the practice of the inverted PSA process as desired. Even when the processing features and conditions are optimized, however, appreciable amounts of the heavy component(s) will be present in the waste stream removed in step (3) at high pressure. The inverted PSA process and system is suitable for practical commercial operation, therefore, for the concentration of heavy component product only when a feed gas stream of low value is being processed.

The duplex PSA process and system of the invention is illustrated in FIG. 1 in which the feed gas passed to each bed of a two-bed system at an intermediate point therein. By contrast, the feed gas is passed to a feed end of each bed in the normal PSA and the inverted PSA processes and systems referred to above. In the FIG. 1 embodiment, feed gas in line 1 is compressed by means of compressor 2 and passed, alternately, through valve 3 to adsorbent bed 4 at an intermediate point 5 between the ends thereof, or through valve 6 to bed 7 at intermediate point 8 thereof. Light component removed from the upper end of bed 4 is passed through valve 9 to line 10 for recovery as light component product gas. Similarly, light component removed from the upper end of bed 7 is passed through valve 11 to said line 10 for recovery as said light product gas. A portion of the light component removed from the top of either bed can be passed to the top of the other bed by passage through line 12 containing valve 13.

Heavy component removed from the bottom of bed 4 can be passed through line 14 containing valve 15 for passage to line 16 containing valve 17 for recovery as heavy component product gas. Similarly, heavy component removed from the bottom of bed 7 can be passed through line 18 containing valve 19 for passage to said product line 16. The heavy component from beds 4 and 7 can also be passed through valves 20 and 21, respectively, for passage to compressor 22 and optional storage vessel 23 prior to recovery as heavy component product or recycle to the system. Valves 24 and 25 are provided so that the systems can conveniently continue to run in an unloaded condition without unneeded compression of the feed gas and heavy component product streams.

Figure 2:
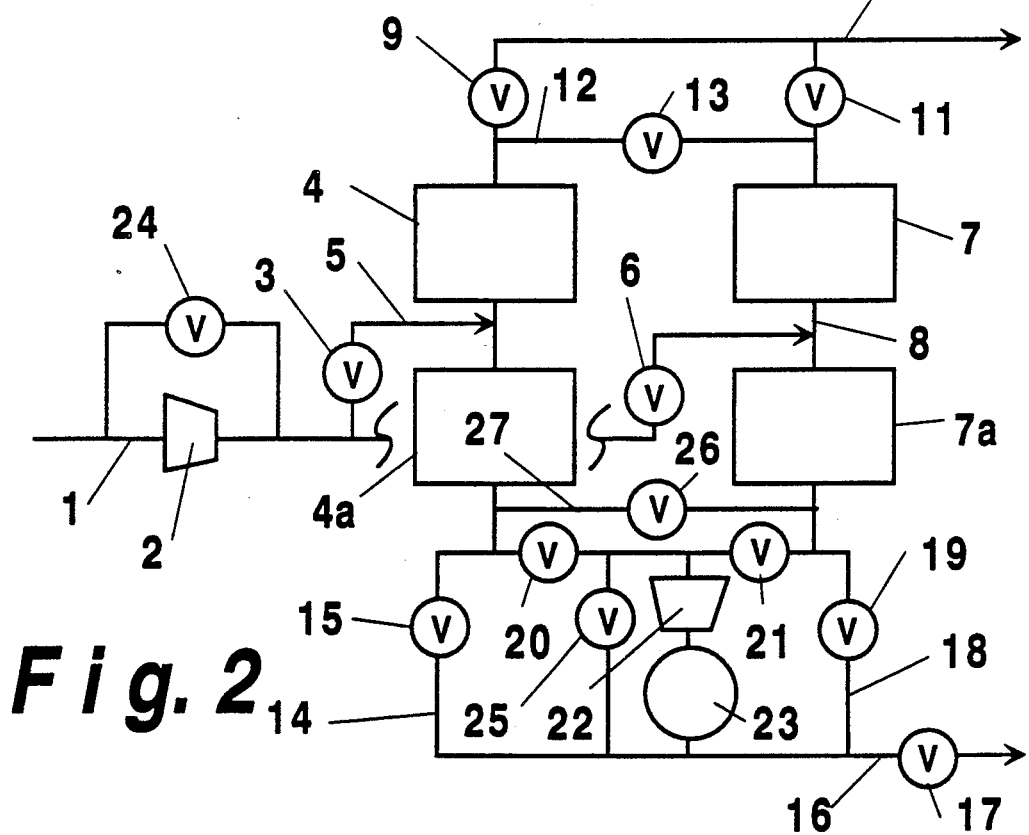
FIG. 2 is a schematic drawing illustrating a four-bed duplex PSA system used in the practice of the invention.

The system shown in the FIG. 2 drawing is essentially the same as the two-bed duplex system of FIG. 1, except that the beds are divided at the feed point, resulting in a four-bed system. Thus, the FIG. 2 embodiment employs separate pairs of beds 4 and 4a and 7 and 7a, respectively, with feed gas passing to lines 5 and 8 communicating, respectively, with each pair of beds at an intermediate point there between.

It will be understood that, in the practice of the invention, the upper portion of the duplex systems, i.e. the upper portion of bed 4 in the FIG. 1 embodiment, and beds 4 and 7 in the FIG. 2 embodiment, function as does the light-product end of a system for the normal PSA process. Similarly, the lower portion of the duplex systems, i.e. the lower portion of bed 4 in the FIG. 1 embodiment, and of beds 4a and 7a in the FIG. 2 embodiment, function as does the heavy-product end in the inverted PSA process of Wilson.

With reference to the FIG. 2 embodiment, the feed gas comprising a binary mixture of light and heavy, i.e. less and more selectively adsorbable, components is passed in line 1 to compressor 2 for compression to a high adsorption pressure. During one portion of the overall processing cycle, the compressed feed gas is passed through valve 3 to line 5 for passage to the bottom of bed 4. This feed gas, combined with the effluent from the upper end of bed 4a, flows upward through bed 4 wherein the heavy component is adsorbed, leaving the less selectively adsorbed light component to pass through the bed and emerge from bed 4. A portion of this purified light gas stream is passed through valve 9 and is withdrawn in line 10 as light product. The remaining purified light gas is expanded to low pressure through valve 13 and enters the upper, light product end of bed 7. This low-pressure gas flows backward through bed 7 where it acts to displace from the bed the heavy component previously adsorbed thereon in an earlier step of the cyclic process. The effluent thus removed from bed 7 through the bottom end thereof is passed through line 8 directly to the top of bed 7a where it continues to act to drive the heavy component from the bottom end of bed 7a. The effluent from bed 7a is passed through valve 21, is compressed in compressor 22 and enters storage container 23. A portion of this gas is withdrawn through line 16 and valve 17 for recovery as heavy product. Another portion of the gas from storage vessel 23 is passed through line 14 and valve 15 to the bottom end of bed 4a. This gas then flows forward through bed 4a displacing the light component therein. The effluent from bed 4a, which ideally can be near the composition of the feed stream, is combined with the feed gas being passed through line 1 and valve 3 to line 5 for passage into the lower end of bed 4. This step of the overall cyclic processing sequence must be terminated before the adsorption front of more selectively adsorbable component breaks through bed 4 and passes into the light product removed from the system and/or the portion thereof recycled through line 12 and valve 13 to the upper end of bed 7.

During the next step of the PSA processing sequence, beds 4 and 4a are depressurized from the upper adsorption pressure, and beds 7 and 7a are repressurized from the lower desorption pressure to said upper adsorption pressure. In one desirable embodiment, a pressure equalization step is employed so that desirable pressure recovery can be achieved. For this purpose, the feed to the system and output flows from the system can be suspended during the period of time in which pressure equalization between the beds is being achieved. Thus, valves 3, 9, 11, 15, 19, 20 and 21 are all closed, while valve 13 is left open until the pressures equalize to some extent by the passage of gas from the top of bed 4, initially at the upper adsorption pressure, to the top of bed 7, initially at the lower desorption pressure. Valve 13 is then closed, and valves 20 and 19 are opened so that beds 4 and 4a can be further depressurized by the passage of gas from the bottom bed 4a, while beds 7 and 7a are further repressurized to the upper adsorption pressure by the flow of gas from storage vessel 23 to the bottom end of bed 7a. During the carrying out of such steps, valves 24 and 25 can be opened when no flow is required from compressors 2 and 22, so that these units can continue to run in an unloaded form.

During the next portion of the processing sequence, the feed gas from compressor 2 is passed through line 8 and valve 6 and flows upward through bed 7 at the upper adsorption pressure. Some of the purified light product separated from the more selectively adsorbable heavy component in bed 7 is passed through valve 11 and recovered as light product. The remaining portion of the purified light product is expanded through valve 13 and is passed to the upper end of bed 4, wherein it flows downward through the bed to displace the previously adsorbed heavy product. The effluent from bed 4 is passed downward through line 5 and into the upper end of bed 4a, where it flows downward carrying additional quantities of the previously adsorbed heavy component. The effluent from bed 4a is passed through valve 20, is compressed in compressor 22 and is passed to storage vessel 23. Some gas from storage vessel 23 is withdrawn through line 16 and valve 17 as heavy product, while additional gas from said storage vessel 23 is passed through line 11 and valve 19 to serve as displacement gas passed to the bottom end of bed 7a. The effluent from bed 7a is combined with feed gas in line 8 and is passed into the bottom of bed 7. Such operation is terminated before the adsorption waves in beds 7a and 7 break through into the effluent removed from the upper ends of said beds.

In the final portion of the overall processing sequence, a pressure equalization is carried out as in the second portion thereof, so as to recover pressure in the beds initially at the upper adsorption pressure and thereby to pressurize the beds initially at lower desorption pressure to a higher intermediate pressure. At the end of the pressure equalization, valve 13 is closed, and valves 15 and 21 are opened to allow beds 7 and 7a to further depressurize and beds 4 and 4a to be repressurized. Upon thus completing the processing sequence, the cycle is repeated with fresh quantities of feed gas being passed to the beds in the processing sequence outlined above.

It will thus be seen that the practice of the invention enables less selectively adsorbable light component to be displaced and recovered at one end of the system, and for more selectively adsorbable heavy component to be displaced and recovered at the other end of the system. The duplex pressure swing adsorption process employs a system having at least one pressure swing adsorption stage containing adsorbent material capable of adsorbing a more selectively adsorbable heavy component from the feed gas mixture containing said component and a less selectively adsorbable light component. In various embodiments, the use of two or more stages will be preferred, depending upon the overall conditions and requirements pertaining to a given application. Upon such selective adsorption, adsorption fronts of said more selectively adsorbable heavy component will tend to form in the adsorbent stage. Each stage will have the normal bed portion and the inverted bed portion referred to above. Each stage will undergo, on a cyclic basis, the processing sequence described above and more generally summarized as follows:

The more selectively adsorbable heavy component is passed at an upper adsorption pressure to the bottom end of the inverted portion of the stage to displace less selectively adsorbable light component therefrom. The effluent gas thus displaced from the upper end of the inverted bed portion is passed into the lower end of the normal bed portion of the stage at the upper adsorption pressure for passage forward therethrough. The less selectively adsorbable light component is discharged from the upper end of the normal bed portion of the stage. The stage is then depressurized from the upper adsorption pressure to a lower desorption pressure.

Less selectively adsorbable light component is then passed to the upper end of the normal bed portion at the lower desorption pressure for passage therethrough in a backward direction, thus displacing previously adsorbed heavy component therefrom. The effluent gas thus displaced from the bottom end of the normal bed portion is passed into the upper end of the inverted bed portion at the lower desorption pressure to displace additional quantities of the heavy component therefrom at said lower desorption pressure. The more selectively adsorbable heavy component is discharged from the bottom end of the inverted bed portion at said lower desorption pressure. The stage is then pressurized from the lower desorption pressure to the upper adsorption pressure.

It will be understood that the feed gas mixture to be separated can be introduced into the stage at an intermediate point between the normal bed portion and the inverted bed portion thereof during at least one of the steps in which (a) the heavy component is passed to the bottom end of the inverted bed portion of the stage, (b) the stage is depressurized from the upper adsorption pressure to a lower desorption pressure, (c) the light component is passed to the upper end of the normal bed portion of the stage and (d) the stage is pressurized from the lower adsorption pressure to the upper adsorption pressure. Upon completion of the processing sequence, the processing steps are repeated in the stage with additional quantities of the feed gas mixture in a desired relationship with other stages in the overall system likewise undergoing said processing sequence.

For certain embodiments, it will be preferred to introduce the feed gas mixture to the stage during the passing of said more selectively adsorbable heavy component to the bottom end of the inverted bed portion of the stage at the upper adsorption pressure. In other embodiments, however, it may be preferred to add the feed gas mixture during the step in which the less selectively adsorbable light component is being passed to the upper end of the normal bed portion at lower desorption pressure, or during the pressurization or depressurization steps, or during a combination of said steps, depending upon the requirements of a given application.

While the invention has been described herein with reference to the lower or bottom end, and to the upper end, of the normal bed portion and to the inverted bed portion of each stage, said reference to upper and lower ends will be understood to be for convenience only, coinciding with the illustrated positioning of the bed portions in the drawings. It is within the scope of the invention, however, to position the stages, the individual portions thereof, and the flows to and from said stages and portions, in other desired configurations in practical commercial applications.

While the invention has been described above with respect to a duplex pressure swing adsorption process, it is also within the scope of the invention to separate a fluid mixture using the duplex adsorption process in thermal swing processing embodiments. In such thermal swing adsorption (TSA) operation, a lower adsorption temperature will correspond to a higher adsorption pressure, and a higher desorption temperature will correspond to a lower desorption pressure. It will be appreciated that the PSA processing operations include provisions for compressing and depressurizing the stages and the feed streams thereto, and the TSA processing operations include corresponding provisions for heating and cooling the stages and the feed streams thereto. For such heating operations, indirect heating or heating by the use of tubes embedded in the stages can be employed. Heat exchangers can be employed for desired cooling, and compression and vent means can readily be employed to achieve the desired adsorption and desorption levels in PSA operations.

As illustrated in the FIGS. 1 and 2 embodiments, each PSA or TSA stage can comprise a single bed of adsorbent material, or each stage can comprise individual adsorbent beds for the normal bed portion and the inverted bed portion of each stage. At least two PSA or TSA stages are commonly preferred, but in particular fluid separation processes having particular processing requirements, a one stage system may be desirable.

In the practice of the invention, a portion of the less selectively adsorbable light component discharged from the upper end of the normal bed portion of a stage is commonly recovered from the system for use as a desired product or co-product or for disposal from the system as a waste stream of the fluid separation operation. Another portion of said light component is commonly used for passage to the upper end of one or more stages during the displacement step in which such light component is passed to the upper end of the normal bed portion of a stage at the lower desorption pressure for a PSA process, or at the higher desorption temperature for a TSA process. Similarly, a portion of the more selectively adsorbable heavy component discharged from the lower end of the inverted bed portion of a stage is commonly recovered as a desired product or co-product or for disposal from the system as a waste stream of the fluid separation operation. Another portion of said heavy component is commonly compressed or cooled and passed to the lower end of one or more stages during the displacement step in which the heavy component is passed to the lower end of the inverted bed portion thereof at the upper adsorption pressure for a PSA process, or at the lower adsorption temperature for a TSA process. It will be understood that the portion of said light and heavy components discharged from one stage can be used as displacement fluid in other stages, or in the stage from which it was discharged, depending on the circumstances pertaining to the overall system employed in the practice of the invention.

In systems having two or more PSA or TSA stages, the pressurization and depressurization, or alternatively, the cooling and heating, steps of the process desirably include equalization steps in which gas is passed from a stage initially at a higher pressure or temperature to a stage initially at lower pressure or temperature for energy recovery purposes as indicated above.

The process of the invention can be used to achieve a variety of commercially significant fluid separations. The PSA embodiments of the invention are highly desirable for gas separation, such as argon-oxygen separations and argon purification operations. In a typical argon-oxygen separation application, a gas stream containing about 96% oxygen and 4% argon can be used to produce a high purity oxygen stream containing 98% or more, e.g. 99.5% oxygen. An argon-enriched stream is also obtained as for example a 50% argon - 50% oxygen stream or a higher argon purity stream, such as, for example, a 95% argon stream. In such operations, argon is the less selectively adsorbable light component, and oxygen is the more selectively adsorbable heavy component. In argon purification operations, argon as the light component is separated from heavy impurities, such as oxygen, or nitrogen, hydrocarbons, carbon monoxide, carbon dioxide and ammonia. In other argon purification operations, a heavy argon product is separated from light impurities such as hydrogen, helium or neon. Helium or hydrogen purifications are other desirable applications of the invention, in which light helium or hydrogen product is recovered from heavy impurities such as nitrogen and methane. In other desirable PSA separations, the invention can be used to separate methane from natural gas; nitrogen from methane and carbon dioxide; nitrogen from carbon monoxide; xenon or krypton purification from heavy impurities; nitrogen and methane recovery from heavy impurities and the like.

TSA processes of particular commercial interest include gas separations, such as the separation and recovery of light nitrogen from heavy carbon monoxide and/or carbon dioxide components, and liquid separations such as the separation and recovery of water as the heavy component from ethanol, as the light component, and the separation and recovery of normal hydrocarbons from mixtures thereof with iso-hydrocarbons.

Those skilled in the art will appreciate that various changes and modifications can be made in the details of the invention as described herein without departing from the scope of the invention as recited in the appended claims. For example, the process can be carried out using any adsorbent material capable of selectively adsorbing a more selectively adsorbable heavy component from a feed gas or other fluid mixture containing said component and a less selectively adsorbable light component. Equilibrium type adsorbent materials, such as zeolitic molecular sieves, e.g. conventional 13X and 5A, can be used, as can rate-selective adsorbent materials, such as activated carbon adsorbents and 4A molecular sieves. It will also be appreciated that the number of stages employed can be varied, and variations can be made in the processing sequence in accordance with known practices in the PSA and TSA art, particularly in the pressure or temperature change steps, to smooth out the overall operation and the flow of desired product therefrom.

The duplex PSA process of the invention is particularly useful for the removal of a heavy impurity from a valuable, weakly adsorbable light component. In such a case, a high recovery of the light gas is required and cannot be achieved by conventional PSA processing. A particular example of this is the removal of nitrogen from an impure argon stream containing about 100 ppm of nitrogen. A super-atmospheric operation is desirable to assure that ambient air cannot leak into the argon. Using the system as shown in FIG. 1, the impure argon feed stream is employed at 210 kPa, with the desorption pressure being 105 kPa, thus providing a pressure ratio of 2:1 with no vacuum required in this case. At an ambient temperature of 300° K., the adsorbent bed(s) of 13X molecular sieve material in equilibrium with 100 ppm of nitrogen in argon at 210 kPa are in equilibrium with 172 ppm of said nitrogen at 105 kPa. Removal of the more selectively adsorbable nitrogen by the low-pressure displacement step of the invention requires that at least 58% of the effluent from the adsorption bed be used for the low pressure displacement step. In practice, a displacement flow of 60% or more is used in this case to compensate for any non-idealities in the process and to insure that the desired purity is achieved. If only the normal process were employed with a displacement flow of as low as 60%, the argon recovery would be limited to about 40%, which is unacceptable in commercial practice. This recovery could only be increased by increasing the pressure ratio, by raising the high pressure or by resorting to vacuum desorption. The recovery by such conventional processing would nevertheless still be poor, and the process unsatisfactory for such argon purification and recovery operations.

In the duplex process of the invention, the effluent stream from the normal bed portion is passed into the inverted bed portion. For this particular application, this portion is operated with a very high reflux ratio, i.e. the ratio of the forward flowing high-pressure displacement to the backward flowing low-pressure stream.

For beds initially filled with nearly pure argon, the nitrogen concentration in the storage vessel slowly increases and appreciates a limit depending on the amount of withdrawal through valve 17 of said FIG. 1 embodiment. If only 1% of the light product flow is bled off through said valve 17, the composition of the storage vessel eventually approaches 1% nitrogen in argon. This corresponds to an argon recovery of about 99%. For higher bleed rates, the concentration is less, and the recovery is lower, whereas, for lower bleed rates, the concentration of nitrogen is higher, and the argon recovery is higher. It will be appreciated that the economic limit for argon recovery will be determined by an economic evaluation pertaining to any given application, but recoveries in excess of 99% are obtainable in the practice of the duplex process of the invention. The separation of air into oxygen (plus argon) and nitrogen is an example of the separation of a feed gas stream into purified light and heavy streams. In many such applications, only a single product, oxygen or nitrogen, is required, and the other components are discharged as waste. In such cases, a high product recovery may not be very important, since the ambient air is a free commodity, and the duplex process of the invention is not needed in this case. If both products are of value, it is desirable to minimize waste, and the use of the duplex process is advantageous.

Furthermore, when feed air is compressed and pretreated to remove water vapor or carbon dioxide, for example, it is no longer a so-called free commodity, and high recovery becomes important from an economic view point. The duplex adsorption process of the invention is capable of achieving the desired recovery.

In the practice of the invention for such air separation in accordance with the FIG. 2 embodiment, gas flows forward at high pressure in beds 4 and 4a, and backward at low pressure in beds 7 and 7a. Nitrogen is desorbed and displaced from beds 7 and 7a, and is readsorbed at a higher partial pressure in bed 4a. It will be appreciated that the movement of the adsorption fronts in this air separation application are controlled so that the heavy product, i.e. nitrogen, is obtained in a highly pure form, containing very little light components, i.e. oxygen and argon. Thus, little or no breakthrough of the desorption front in the inverted bed portion can be tolerated. For each portion of a stage, the front moves forward as an adsorption front during the high-pressure steps when gas flow is forward. The front moves backward as a desorption front during the low-pressure steps when the gas flows backward. In the normal bed portion, the front should desirably move no farther forward during the forward-flow steps of this application than it can move backward during the backward-flow steps. This can be assured by using enough backward displacement gas in relation to the net forward product flow.

In the inverted bed portion, the front should desirably move no further backward during the set of backward flow steps than it moves forward during the set of forward-flow steps. This cannot be assured simply by using enough forward displacement gas in relation to the net backward product flow, because the ratio of front speed to gas flow rate is lower at high pressure than at low pressure. Even if all of the gas leaving the end of the inverted bed portion were used as forward displacement gas, leaving none for the net backward product, the front would move further during the constant-pressure backward-flow step. In order to avoid breakthrough in this circumstance pertaining to said air separation application, the varying pressure steps are carried out so that the front moves further forward than backward. Furthermore, this is carried out without using a significant net forward gas flow during the set of varying pressure steps since any such net flow would require a balancing net backward flow during the constant-pressure steps, which would tend to worsen this circumstance.

As a result, the invention is carried out for said air separation application using full forward flow during the pressurization step and full backward flow during the depressurization step. In one step, the entire stage, both the normal bed portion and the inverted bed portion, is pressurized by introducing forward flow of pure, heavy-rich gas at the bottom of the inverted bed portion. In the corresponding depressurization step, a backward flow of pure heavy-rich gas is passed from the lower end of the inverted bed portion. The average pressures for the two steps are nearly the same so the average ratios of adsorption front speed to local gas flow rate are nearly the same. The total gas flows at the lower end of the inverted bed portion are also nearly the same. However, the average position of the front is closer to the inverted end of the stage during the pressurization step than during the depressurization step, and the local gas flows vary strongly, being much greater nearer the inverted end. This variation in local gas flow rate provides the needed difference in adsorption front speeds. The result is a net forward motion of the front during the varying-pressure steps great enough to counteract the net backward motion during the constant-pressure steps. As a result, total net motion is negligible, and converges to zero as the cyclic operation is continued.

It will be appreciated that, for air separation applications, the use of appropriate varying-pressure steps is needed to balance forward speed motion and prevent undesired light-component breakthrough into the heavy product. The use of a significant amount of gas flow at the normal bed portion end of the stage would ordinarily be employed, as in the argon purification application referred to above. In such operation in this air separation application, however, the motion of the front in the inverted portion of the stage could not be balanced by using any amount of reflux, however large, and intolerable amounts of light component would escape into the heavy product.

In the operation of the duplex process for air separation, it is desirable to carry out pressure equalization at the heavy-product end of the beds by, for example, opening valve 26 in line 27, with the other valves being closed. This step is continued until the pressures in beds 4a and 7a are nearly equal. The pressures in beds 4 and 7 may be equalized simultaneously be allowing gas to flow through valve 13, but it is preferable to conduct all of the equalization flow for this application through valve 26. After equalization of the pressures, valve 26, and valve 13 if it were open, is closed, and valves 20 and 19 are opened, thus permitting compressor 22 to continue to reduce the pressure in bed portions 4 and 4a, and to increase the pressure in bed portions 7 and 7a.

As in the general practice of the invention, and in the illustrative example above, the remaining steps of the cyclic process are carried out in a similar manner for said air separation application, but with the valves set so as to effectively interchange the positions of beds 4 and 7 and of beds 4a and 7a.

In the operation of the duplex process for air separation at 300° k., a high pressure of 105 kPa and a low pressure of 70 kPa, using 13X molecular sieve adsorbent, with a total bed volume of 360 cubic meters, i.e. 252,000 kg, and with a cyclic time of 60 seconds, an oxygen and argon light product can be obtained at an almost total recovery of 99.9+% with a nitrogen concentration of about 10 ppm, and a nitrogen heavy product can be obtained at an almost total recovery of 99.9+% with an oxygen and argon content of about 5 ppm.

The duplex process of the invention will be seen to provide a highly desirable advance in the adsorption art. By enabling both the less selectively adsorbable light component and the more selectively adsorbable heavy component of a fluid feed mixture to be obtained at enhanced purity and recovery levels, the invention enables desirable adsorption technology, both pressure swing adsorption and thermal swing adsorption, to be applied effectively in practical commercial applications of increasing industrial significance.

I claim:

1. A duplex pressure swing absorption process for separating a fed gas mixture in a system having at least one pressure swing adsorption stage containing absorbent material capable of absorbing a more selectively absorbable heavy component from said feed gas mixture containing said component and a less selectively absorbable light component, thereby forming an absorption front of said more selectively absorbable heavy component in said absorbent stage, said absorbent stage having a normal bed portion and an inverted bed portion and undergoing, on a cyclic basis, a processing sequence comprising:

(a) passing said more selectively absorbable heavy component at an upper absorption pressure to the bottom end of the inverted bed portion of said stage to displace less selectively absorbable light component thereon, the effluent gas thus displaced from the upper end of said inverted bed portion being passed into the lower end of the normal bed portion of said stage at said upper absorption pressure for passage forward therethrough;

(b) discharging less selectively absorbable light component from the upper end of the normal bed portion of said stage;

(c) depressurizing said stage from said upper absorption pressure to a lower desorption pressure;

(d) passing less selectively absorbable light component gas to the upper end of the normal bed portion at said lower desorption pressure for passage therethrough in a backward direction, thus displacing previously absorbed heavy component therefrom, the effluent gas thus displaced from the bottom end of the normal bed portion being passed into the upper end of said inverted bed portion at said lower desorption pressure to displace additional quantities of heavy component therefrom at said lower desorption pressure;

(e) discharging heavy component from the bottom end of said inverted bed portion at said lower desorption pressure;

(f) pressurizing said stage from said lower desorption pressure to the upper absorption pressure;

(g) introducing said feed gas mixture to said stage at an intermediate point between said normal bed portion and said inverted bed portion during at least one of said steps (a), (c), (d) and (f); and (h) repeating said steps (a)–(g) on a cyclic basis with additional quantities of said feed gas mixture, whereby the less selectively absorbable light component and the more selectively absorbable heavy component are both recovered at enhanced purity and recovery levels.

2. The process of claim 1 in which the feed gas mixture is introduced to the stage at said intermediate point during said step (a).

3. The process in claim 1 in which the feed gas mixture is introduced to the stage at said intermediate point during step (d).

4. The process of claim 1 in which each stage comprises a single absorbent bed.

5. The process of claim 1 in which each stage comprises an individual absorbent bed for the normal bed portion and for the inverted bed portion.

6. The process of claim 1 in which said system comprises two pressure swing absorption stages.

7. The process of claim 1 in which a portion of the less selectively absorbable light component discharged in step (b) is recovered from the system and another portion is used for passage to the upper end of one or more stages during step (d) therein, and a portion of the more selectively absorbable heavy component discharged in step (e) is recovered from the system but another portion is used for passage to the bottom end of one or more stages during step (a) therein.

8. The process of claim 1 in which said system comprises two or more pressure swing absorption stages and depressurization step (c) and pressurization step (f) include initially passing gas from one stage at a higher pressure to another stage initially at a lower pressure to equalize the pressure therebetween.

9. The process of claim 1 in which said feed gas mixture comprises a mixture of oxygen, as the more selectively absorbable heavy component, and argon, as the less selectively absorbable light component.

10. The process of claim 1 in which said feed gas comprises argon as the less selectively absorbable light component and impurities as the more selectively absorbable heavy component.

11. The process of claim 1 in which said feed gas mixture comprises helium as the less selectively absorbable light component and nitrogen and methane as the more selectively absorbable heavy component.

12. The process of claim 1 in which said feed gas mixture comprises hydrogen as the less selectively absorbable light component and impurities as the more selectively absorbable heavy component.

13. The process of claim 1 in which the feed gas mixture comprises xenon as the less selectively adsorbable light component and impurities as the more readily adsorbable heavy component.

14. The process of claim 1 in which the feed gas mixture comprises krypton as the less selectively adsorbable light component and impurities as the more readily adsorbable heavy component.

15. A duplex thermal swing absorption process for separating a fluid mixture in a system having at least one thermal swing absorption stage containing absorbent material capable of absorbing a more selectively absorbable heavy component from a feed gas mixture containing said component and a less selectively absorbable light component, thereby forming an absorption front of said more selectively absorbable heavy component in said absorbent, each stage having a normal bed portion and an inverted bed portion and undergoing, on a cyclic basis, a processing sequence comprising:

(a) passing said more selectively absorbable heavy component at a lower absorption temperature to the bottom end of the inverted bed portion of said stage to displace less selectively absorbable light component therefrom, the effluent fluid thus displaced from the upper end of said inverted bed portion being passed into the lower end of the normal bed portion of said stage at said lower absorption temperature for passage forward therethrough;

(b) discharging less selectively absorbable light component from the upper end of the normal bed portion of said stage;

(c) heating said stage from the lower absorption temperature to an upper desorption temperature;

(d) passing less selectively absorbable light component to the upper end of the normal bed portion at said upper desorption temperature for passage therethrough in a backward direction, thus displacing previously absorbed heavy component therefrom, the effluent thus displaced from the bottom end of the normal bed portion being passed into the upper end of said inverted bed portion at said upper desorption temperature to displace additional quantities of the heavy component therefrom at said upper desorption temperature;

(e) discharging heavy component from the bottom end of said inverted bed portion at said upper desorption temperature;

(f) cooling said stage from said upper desorption temperature to the lower absorption temperature;

(g) introducing said fluid mixture to said stage at an intermediate point between said normal bed portion and said inverted bed portion during at least one of said steps (b), (c), (d) and (f); and (h) repeating said steps (a)-(g) on a cyclic basis with additional quantities of said fluid mixture, whereby the less selectively absorbable light component and the more selectively absorbable heavy component are both recovered at enhanced purity and recovery levels.

16. The process of claim 15 in which the fluid mixture is introduced to the stage at said intermediate point during said step (a).

17. The process of claim 15 in which the fluid mixture is introduced to the stage at said intermediate point during step (d).

18. The process of claim 15 in which each stage comprises a single adsorbent bed.

19. The process of claim 15 in which each stage comprises an individual adsorbent bed for the normal bed portion and for the inverted bed portion.

20. The process of claim 15 in which said system comprises two thermal swing adsorption stages.

21. The process of claim 15 in which a portion of the less selectively adsorbable light component discharged in step (b) is recovered from the system and another portion is used for passage to the upper end of one or more stages during step (d) therein, and a portion of the more selectively adsorbable heavy component discharged in step (e) is recovered from the system and another portion is used for passage to the bottom end of one or more stages during step (a) thereof.

22. The process of claim 15 in which said system comprises two or more thermal swing adsorption stages and heating step (c) and cooling step (f) include passing fluid from one stage initially at a higher temperature to another stage initially at a lower temperature to equalize the temperature therebetween.

23. The process of claim 15 in which said fluid mixture comprises water as the less selectively adsorbable light component and impurities as the more selectively adsorbable heavy component.

24. The process of claim 15 in which said fluid mixture comprises argon as the less selectively adsorbable light component and impurities as the more selectively adsorbable component.

25. The process of claim 15 in which said fluid mixture comprises nitrogen as the less selectively adsorbable light component and carbon oxide impurities as the more selectively adsorbable heavy component.

26. The process of claim 15 in which said fluid mixture comprises water as the more selectively adsorbable heavy component and ethanol as the less selectively adsorbable light component.

27. The process of claim 15 in which said fluid mixture comprises n-hydrocarbons as the less selectively adsorbable light component and iso-hydrocarbons as the more selectively adsorbable components.

* * * * *

UNITED STATES PATENT AND TRADEMARK OFFICE
CERTIFICATE OF CORRECTION

PATENT NO. : 5,085,674            Page 1 of 2

DATED : February 4, 1992

INVENTOR(S) : Frederick W. Leavitt

It is certified that error appears in the above-identified patent and that said Letters Patent is hereby corrected as shown below:

Change "absorption" to ---adsorption--- in the following:

Col. 16 Claim 1, lines 1 and 7; step (a), lines 2 and 8; step (c), lines 1-2; and step (f), line 2; Claim 6 and 8, line 2;
Col. 17/18 Claim 15, lines 1,3,7, step (a) lines 2 and 8-9; step (c), line 1; and step (f), line 2.

Change "absorbent" to ---adsorbent--- in the following:

Col. 16 Claim 1, lines 3-4 and 9;
Col. 16 Claims 4 and 5, line 2;
Col. 17 Claim 15, lines 3 and 9.

Change "absorbable" to ---adsorbable--- in the following:

Col. 16 Claim 1, lines 5, 6-7 and 8; step (a), lines 1 and 4; step (b), line 1; step (d), line 1; step (h), lines 3 and 4;

Col. 17 Claim 7, line 2;
Col. 17 Claim 9, lines 3 and 4;
Col. 17 Claim 10, lines 2 and 3-4;
Col. 17 Claims 11 and 12, lines 2-3 and 4;
Col. 17/18 Claim 15, lines 4-5, 6 and 8; step (a), lines 1 and 4; step (b), line 1; step (d), line 1; whereby clause, line 1 and 2.

UNITED STATES PATENT AND TRADEMARK OFFICE
CERTIFICATE OF CORRECTION

PATENT NO. : 5,085,674
DATED : February 4, 1992
INVENTOR(S) : Frederick W. Leavitt It is certified that error appears in the above-identified patent and that said Letters Patent is hereby corrected as shown below:

Change "absorbing" to ---adsorbing--- in the following:
Col 16 and Col 17,18
Claims 1 and 15, line 4;

Change "absorbed" to ---adsorbed--- in the following:

Claims 1 and 15, step (d), line 5
Claim 1, line 2, change "fed" to ---feed---

Signed and Sealed this

Eighteenth Day of May, 1993

MICHAEL K. KIRK

Attest:

Attesting Officer

Acting Commissioner of Patents and Trademarks